United States Patent [19]

Higgins et al.

[11] Patent Number: 4,581,282

[45] Date of Patent: Apr. 8, 1986

[54] ENHANCED DURABILITY SOLAR INSULATING WINDOW FILM AND ASSEMBLY USING THE SAME

[75] Inventors: Patrick K. Higgins; Roger W. Phillips; James K. Snyder, all of Santa Rosa, Calif.

[73] Assignee: Optical Coating Laboratory, Inc., Calif.

[21] Appl. No.: 567,637

[22] Filed: Jan. 3, 1984

[51] Int. Cl.⁴ .............................................. B32B 15/04
[52] U.S. Cl. ................................... 428/216; 428/458; 428/461; 428/668; 428/671; 428/675; 350/1.7
[58] Field of Search ............... 428/668, 671, 675, 458, 428/461, 216; 350/1.7

[56] References Cited

U.S. PATENT DOCUMENTS

| | | | |
|---|---|---|---|
| 4,017,661 | 4/1977 | Gillery | 428/412 |
| 4,166,876 | 9/1979 | Chiba et al. | 428/215 |
| 4,247,599 | 1/1981 | Hopper | 428/458 |
| 4,414,254 | 11/1983 | Iwata et al. | 428/34 |

FOREIGN PATENT DOCUMENTS

| | | | |
|---|---|---|---|
| 8043443 | 3/1983 | Japan | 428/913 |
| 8043357 | 3/1983 | Japan | 428/913 |

*Primary Examiner*—Edith Buffalow
*Attorney, Agent, or Firm*—Flehr, Hohbach, Test, Albritton & Herbert

[57] ABSTRACT

Solar insulating window film comprising a sheet of substantially transparent flexible polymer thin film plastic material having first and second surfaces. First, second and third layers are adherent to the first surface of the film. The second layer is formed of copper. The first layer is formed of a material which possesses substantially the same nobility as copper or is inert to copper. The first layer counting from the first surface is formed of a material selected from nickel and palladium and oxides and sulfides thereof. The third layer counting from the first surface is formed of a material selected from nickel, palladium and chromium and oxides and sulfides thereof.

5 Claims, 3 Drawing Figures

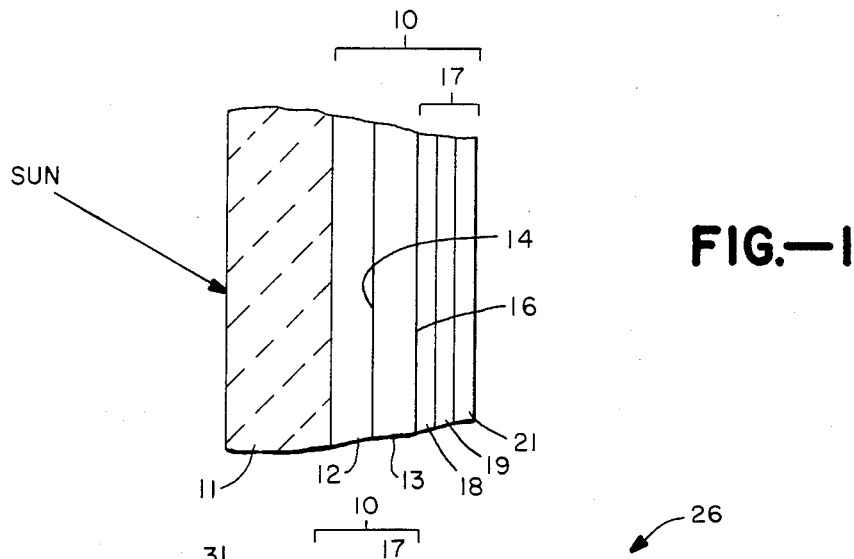
FIG.—1
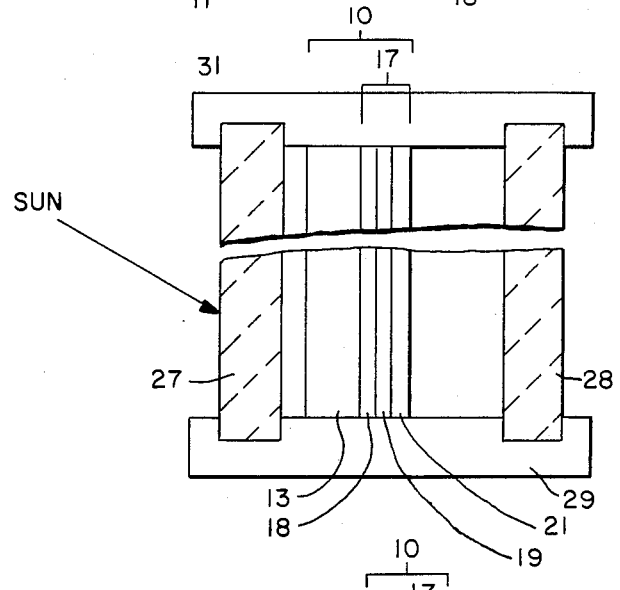
FIG.—2
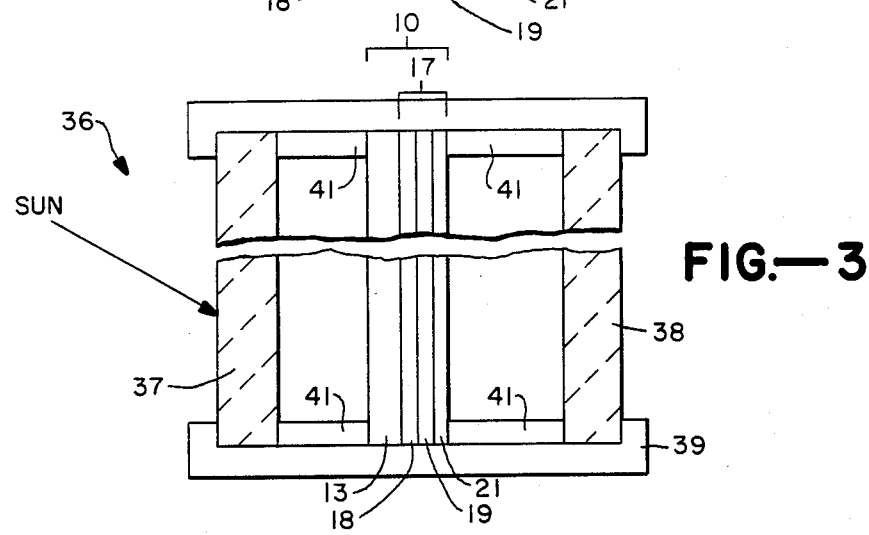
FIG.—3

ENHANCED DURABILITY SOLAR INSULATING WINDOW FILM AND ASSEMBLY USING THE SAME

This invention relates to a solar insulating window film and assembly using the same and, more particularly, one with enhanced durability and particularly weatherability.

In co-pending application Ser. No. 308,025 filed on Oct. 2, 1981 entitled "Flexible Selective Energy Control Sheet and Assembly Using the Same", now U.S. Pat. No. 4,463,047 there is disclosed a copper series of copper based energy control sheets. In connection with this copper series, it was found that in the chromium copper chromium coating combination that the chromium layer adherent to the polyester film corroded very rapidly when exposed to the atmosphere. This corrosion was due to moisture penetration into the coating through pinholes in the coating formed during deposition and resulting in a pinhole corrosion galvanic cell being established. Since copper is more noble than chromium a pinhole corrosion galvanic cell results in the preferential corrosion of the chromium layer adherent to the polyester film and produces very undesirable discolorations throughout the film. In the past to overcome this problem, it has been necessary to laminate the coating between a polyester sheet and a protective polymeric layer, such as a polypropylene sheet to reduce the moisture content within the coating. There is therefore a need for a solar insulating film which can be utilized in severe environments and which does not require the use of a protective layer.

In general it is an object of the present invention to provide a solar insulating film which has enhanced durability and in particular enhanced weatherability.

Another object of the invention is to provide a window film of the above character which does not require the use of a protective polymeric layer, such as a plastic sheet.

Another object of the invention is to provide a window film of the above character in which the emittance of the coating is not changed.

Another object of the invention is to provide an assembly using the window film of the present invention.

Additional objects and features of the invention will appear from the following description in which preferred embodiments are set forth in detail in conjunction with the accompanying drawings.

FIG. 1 is a cross sectional view of a solar insulating window film incorporating the present invention.

FIG. 2 is a cross sectional view of an assembly utilizing a solar insulating window film mounted on one of the interior surfaces of two panes of glass in a double pane construction.

FIG. 3 is a cross sectional view of another assembly utilizing a solar insulating window film of the present invention in which it is suspended between a double pane window construction.

In general, the solar insulating window film of the present invention comprises a sheet of transparent flexible polymer thin film plastic material having a thickness ranging from 12 to 200 micrometers and having first and second surfaces. First, second and third metal layers are adherent to the second surface. The second layer is formed of copper. The first layer counting from the second surface serves as an adhesion promoting layer and functions to prevent pinhole corrosion and the third layer counting from the second surface serves as a protective layer. The first layer is formed of a material selected from nickel and palladium and oxides and sulfides thereof. The third layer is formed of a material which is selected from nickel, palladium, chromium and oxides and sulfides thereof.

In FIG. 1, there is shown a copper series (C series) or a copper based solar insulating window film 10. This window film is secured to a window 11 formed of glass of a conventional type by a conventional adhesive 12. The window film 10 is comprised of a sheet of substantially transparent flexible polymer thin film plastic material. It has a thickness ranging from 12 to 200 micrometers and has first and second surfaces 14 and 16. The first surface 14 is secured to the glass window 11 by the adhesive 12. A coating 17 is adherent to the second surface 16 and is comprised of first, second and third layers 18, 19 and 21.

The sheet 13 is formed of a plastic material of a suitable type such as polyethylene terephthalate (PET). Other possible substitute materials are polypropylene, polyethylene, acrylic and other like polymer substances. The first, second and third layers 18, 19 and 21 should be substantially transparent. The first layer 18 serves as an adhesion promoting layer and should be substantially continuous. In particular it must be thin enough so as not to adversely interfere with the transmission qualities of the window film 10. By way of example, the first layer 18 can have a thickness of approximately 20 Angstroms but could range in thickness from 10 to 100 Angstroms. The second layer 19 is a metal layer formed of copper. The third layer serves as a protective layer. The first layer is formed of a material which possesses substantially the same nobility as copper or is chemically inert to copper. Thus, the first layer is formed of a material which is selected from nickel and palladium and oxides and sulfides thereof.

The second or copper layer 19 has a thickness which is consistent with the desired resultant transmission level for the window film as well as the desired color. By way of example, the thickness of the copper layer can range from 100 to 500 Angstroms with a typical layer having a thickness of 150 Angstroms. The protective or third layer 21 is formed of a material selected from nickel, palladium and chromium and oxides and sulfides thereof. The protective layer is deposited to a thickness ranging from 10 to 200 Angstroms and preferably has a thickness of approximately 40 Angstroms.

It has been found that a window film constructed within these parameters provides controlled visible solar insolation transmitting low thermal emitting durable coating on a polyester substrate. It is ideally suited for application in the window film market particularly in warmer climate areas as a summer film coating. The coated film is utilized in situations where space cooling is the dominant energy usage during the course of a year. The coated film is bronze in color.

A series of designs incorporating the present window film showing the optical properties of these window films is set forth in Table 1 below.

TABLE 1

| Design | % $T_S$ | % $T_{IB}$ | $\epsilon$ |
|---|---|---|---|
| Ni/Cu/Cr | 22.3 | 29.1 | 0.08 |
| Pd/Cu/Cr | 22.7 | 28.5 | 0.09 |
| Ni/Cu/Ni | 20.0 | 27.3 | 0.08 |
| Pd/Cu/Pd | 20.6 | 26.8 | 0.08 |

From Table 1 above, it can be seen that the window or summer film of the present invention consists of three metal layers on a polymer substrate and exhibits certain optical characteristics. The percent of solar transmittance, $\%T_S$, (i.e. the transmittance integrated over a wavelength range between 350 and 2200 nanometers) is controlled and may be as high as 60% dependent on film design. In the embodiments shown in Table 1, the total transmittance range is 20 to approximately 23%. The table also shows percent integrated transmittance for visible light, $\%T_{IB}$, (over the wavelength range between 380 and 770 nanometers) is typically at a ratio to $\%T_S$ of 1.31 ($\%T_S/\%T_{IB}$). The emissivity of the coating is 0.10 or lower. In addition to these characteristics, the durability of the coating in an unprotected state is considerably enhanced over similar types of coatings previously available.

The metals which have been selected for the present coating have been chosen as suitable thin film metals which are chemically and mechanically compatible. The first layer which is closest to the second surface 16 of the PET substrate 13 which, as explained above, can be formed of nickel or palladium preferably possesses the oxidation state of +2 and possesses an oxidation potential referenced to copper ($E_x - E_{Cu}$) greater than $-0.600$ (i.e. $E_{Pd} - E_{Cu} = 0.650$, $E_{Ni} - E_{Cu} = -0.587$, $E_{Cr} - E_{Cu} = -1.081$). The durability of the four designs shown in Table 1 in an unprotected state is set forth in Table 2 below.

TABLE 2

| Design | Hours to Failure |
| --- | --- |
| Ni/Cu/Cr | 240+ |
| Pd/Cu/Cr | 120-144 |
| Ni/Cu/Ni | 72-96 |
| Pd/Cu/Pd | 24-48 |

The durability tests were carried out in a Weather-O-Meter supplied by Atlas Electric Devices Company using an irradiance level of 0.65 W/m²/nm, a light to dark cycle of 20 to 4 hours, a sample temperature of 60° C. in the light cycle and 20° C. in the dark cycle, and a relative humidity of 50% in the light cycle and 98%+ in the dark cycle. All the designs shown in Table 2 exhibited marked improvement over the summer film disclosed in application Ser. No. 308,025 filed on Oct. 2, 1981 now U.S. Pat. No. 4,463,047. For example, an unprotected chromium copper chromium design disclosed in Ser. No. 308,025 failed within a period of 0 to 24 hours under this same test whereas all of the designs listed in Table 2 had a greatly improved durability with the nickel copper chromium design exhibiting the best durability characteristics of the four designs. It was also found that the spectral response curves for the four designs shown in Tables 1 and 2 disclosed that the spectral response was not adversely affected by the change of materials for the layers in the summer film but that the spectral response was at least as good as with a chromium copper chromium film.

The window films of the present invention can be prepared utilizing conventional coating techniques. For example, the films can be applied by batch coating techniques or if desired by continuous roll coating techniques.

From the foregoing it can be seen that it has been possible to provide a summer film which retains an optimized material designed from an optics point of view which has greatly improved corrosion resistance so that durability is significantly enhanced. In addition by the substitution of palladium or nickel for the innermost chromium layer of the previous design (the layer nearest the substrate), it is possible to significantly reduce pinhole corrosion and thus enhance product weatherability.

In connection with the durability tests set forth in Table 2, it should be pointed out that the failure mechanism for the four designs shown in Table 2 is distinctly different from the failure mechanism which occurs in a chromium-copper-chromium design in which failure occurs because of pinhole corrosion causing a chemical breakdown. The failure mechanism observed with respect to the four designs set forth in Table 2 occurred not from a chemical breakdown but from a mechanical breakdown or, in other words, layer delamination. With respect to the materials specified for the designs, it is desirable that the material possess substantially the same nobility as copper or is inert to copper. Since oxides and sulfides of the materials identified are inert or substantially inert, they can also be utilized in designs incorporating the present invention.

In particular, the emittance of the present designs shown in Table 1 are greatly improved over summer films of the type disclosed in application Ser. No. 308,025 filed Oct. 2, 1981, now U.S. Pat. No. 4,463,047 where a protective film must be utilized. When such a protective film is utilized, the emittance rises to approximately 0.34 in comparison to 0.08 for the nickel-copper-chromium design which means that much more heat is being allowed into the room by reradiation in the infrared using a protected chrome-copper-chromium coating. Thus the product of the present invention certainly is more desirable because of the lower emittance and thus clearly a more effective summer film.

The window film of the present invention can be utilized in glazing assemblies of the type shown in FIGS. 2 and 3. The glazing assembly 26 shown in FIG. 2 consists of two panes of glass 27 and 28 of a suitable thickness such as ⅛th of an inch mounted in a frame 29. The window film 10 of the present invention is secured to the inner surface of the pane 27 facing the outside or being exposed to the rays from the sun by suitable means such as an adhesive layer 31. By way of example, the window film 10 can be provided with such an adhesive layer 31 which is covered with a covering material (not shown) that can be stripped off prior to mounting and the window film 10 secured to the inner surface of the glass during manufacture of the glazing assembly 26. Since the film is disposed within a closed environment within the glazing assembly 26, the window film should have a long lifetime.

The glazing assembly 36 shown in FIG. 3 also consists of two panes of glass 37 and 38 mounted in a frame 39. In this case, the window film 10 is suspended between the two panes of glass 37 and 38 by spacers 41. Again, the window film 10 is disposed so that the substrate of the window film faces the side of the glazing which is to be exposed to the sun. As can be seen in FIG. 3, this assembly in effect provides a triple pane window with two dead air spaces to provide improved insulation. In both of the assemblies shown in FIGS. 2 and 3, the film is used in an unprotected state, and thus the excellent emittance properties of the coated film are retained. In other words, additional protective films are not provided on the window film to protect the coating which would have a deleterious effect on the emissivity of the coated film.

From the foregoing it can be seen that glazing assemblies have been provided which have properties which are quite different from glazing assemblies which utilized a protected window film of the type disclosed in application Ser. No. 308,025 filed Oct. 2, 1981 now U.S. Pat. No. 4,463,047. It can be seen that the window film can be utilized by original equipment manufacturers as well as for retrofitting of existing glazing in homes and office buildings and the like.

What is claimed is:

1. In a solar insulating window film, a sheet of substantially transparent flexible polymer thin film plastic material having first and second surfaces, first, second and third layers adherent to said first surface, said second layer being formed of copper, the first layer being formed of a material which possesses substantially the same nobility as copper or is inert to copper, said first layer counting from the first surface being formed of a material selected from nickel and palladium and oxides and sulfides thereof, said third layer counting from the first surface being formed of a material selected from nickel, palladium and chromium and oxides and sulfides thereof.

2. A window film as in claim 1 wherein said transparent flexible polymer plastic material has a thickness ranging from 12 to 200 micrometers.

3. A window film as in claim 2 wherein said copper layer has a thickness ranging from 100 to 500 Angstroms.

4. A window film as in claim 1 wherein said first and third layers have a thickness ranging from 10 to 100 Angstroms.

5. A window film as in claim 1 wherein said first layer is formed of nickel and therein said third layer is formed of chromium.

* * * * *